US012578265B2

(12) United States Patent
Seichter et al.

(10) Patent No.: US 12,578,265 B2
(45) Date of Patent: Mar. 17, 2026

(54) PREPARATION METHOD FOR PREPARING SPECTROMETRIC DETERMINATIONS OF AT LEAST ONE MEASURAND IN A TARGET APPLICATION

(71) Applicant: Endress+Hauser Conducta GmbH+Co. KG, Gerlingen (DE)

(72) Inventors: Felicia Seichter, Ludwigsburg (DE); Andreas Bayer, Gerlingen (DE); Thilo Krätschmer, Gerlingen (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 458 days.

(21) Appl. No.: 18/069,138

(22) Filed: Dec. 20, 2022

(65) Prior Publication Data
US 2023/0194416 A1     Jun. 22, 2023

(51) Int. Cl.
*G01N 21/27*          (2006.01)
*G01N 21/31*          (2006.01)

(52) U.S. Cl.
CPC ........... *G01N 21/31* (2013.01); *G01N 21/274* (2013.01); *G01N 2021/3188* (2013.01); *G01N 2021/3196* (2013.01)

(58) Field of Classification Search
CPC ...... G01N 21/31; G01N 21/25; G01N 21/274; G01N 21/3577; G01N 2021/3188; G01N 2021/3196; G01N 30/7233; G01N 2223/00; G01N 2030/626; G01J 3/28; G01J 3/02; G01J 3/00; G01J 3/433; G01J 3/30; G01J 3/457; G01J 3/45; G01J 2003/2866; H01J 49/00
(Continued)

(56) References Cited

U.S. PATENT DOCUMENTS

| 5,933,792 | A | 8/1999 | Andersen et al. |
| 8,592,748 | B2 * | 11/2013 | Gall ........................ H05B 45/20 |
| | | | 250/252.1 |

(Continued)

FOREIGN PATENT DOCUMENTS

| CA | 2605467 | A1 * | 11/2006 | ............. G01N 21/25 |
| CN | 112461770 | A | 3/2021 | |

(Continued)

*Primary Examiner* — Jeffrey P Aiello

(74) *Attorney, Agent, or Firm* — Kelly J. Smith; Endress+Hauser (USA) Holding, Inc.

(57) ABSTRACT

A preparation method for preparing spectrometric determinations of a measurand in a target application using a spectrometer is provided. On the basis of reference data recorded in the target application, a normalized measurand master spectrum with a spectral distribution characteristic of the measurand is determined. On the basis of the measurand master spectrum, synthetic spectra are generated which cover a value range greater than or equal to a value range covered by the reference values. On the basis of the synthetic spectra, information for carrying out the spectrometric determinations, including information comprising a property, a wavelength range, and/or a path length range for an optical path length suitable for carrying out the spectrometric determinations, and/or comprising a calculation rule, with which, on the basis of measurement spectra in the target application, measured values of the measurand are determined.

16 Claims, 2 Drawing Sheets

(58) Field of Classification Search
USPC ........... 324/76.12, 76.19; 356/300, 319, 337,
356/317, 326; 702/189, 23, 85, 32, 181,
702/31, 1, 172, 127, 17, 76
See application file for complete search history.

(56) References Cited

U.S. PATENT DOCUMENTS

| | | | | |
|---|---|---|---|---|
| 2003/0028329 | A1 | 2/2003 | Maier | |
| 2006/0197015 | A1 * | 9/2006 | Sterling | ............... A61B 5/1495 |
| | | | | 250/252.1 |
| 2015/0316471 | A1 * | 11/2015 | Andersen | ............ G01N 21/314 |
| | | | | 356/39 |
| 2018/0018047 | A1 * | 1/2018 | Iwami | ................... G06F 3/0412 |

FOREIGN PATENT DOCUMENTS

| | | | | | |
|---|---|---|---|---|---|
| CN | 113795748 | A | 12/2021 | | |
| DE | 69807071 | T2 | 10/2003 | | |
| DE | 102019121304 | A1 * | 2/2021 | ........... | G01N 21/274 |
| EP | 0605409 | B1 * | 1/1996 | ........... | G01N 29/032 |
| EP | 3411738 | B1 * | 4/2024 | ........... | G02B 6/1225 |
| JP | 6525864 | B2 * | 6/2019 | ............... | G01J 3/44 |
| WO | WO-2004006159 | A1 * | 1/2004 | ............. | H01J 49/40 |
| WO | WO-2011104858 | A1 * | 9/2011 | ........... | G07D 7/1205 |
| WO | 2020201484 | A1 | 10/2020 | | |

* cited by examiner

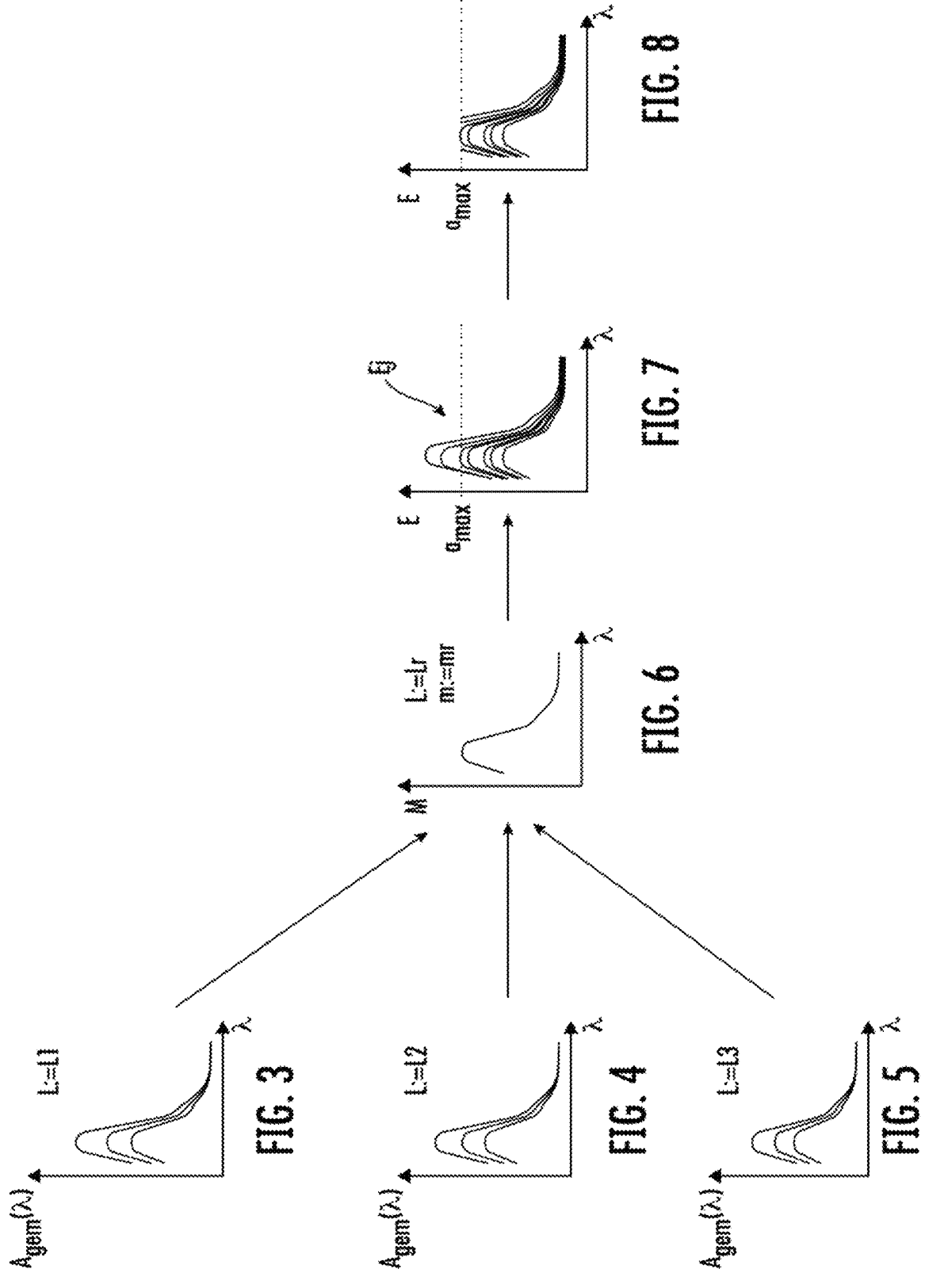

PREPARATION METHOD FOR PREPARING SPECTROMETRIC DETERMINATIONS OF AT LEAST ONE MEASURAND IN A TARGET APPLICATION

CROSS-REFERENCE TO RELATED APPLICATION

The present application is related to and claims the priority benefit of German Patent Application No. 10 2021 133 955.3, filed on Dec. 21, 2021, the entire contents of which are incorporated herein by reference.

TECHNICAL FIELD

The present disclosure relates to a preparation method for preparing spectrometric determinations of at least one measurand of a medium to be carried out in a target application of a predetermined type of application by means of a spectrometer, as well as to uses of this method.

BACKGROUND

Spectrometric determinations of measurands of media are currently already carried out in a large number of different types of applications, such as in water treatment plants, in laundry facilities, and in plants carrying drinking water.

For this purpose, spectrometers are usually used, which comprise a spectrometric unit, equipped with a radiation source and a detector, in which radiation is radiated into the medium, and a measurement radiation resulting from an interaction of this radiation with the medium is received by the detector. Depending upon the design of the spectrometric unit, different forms of the interaction of the radiation with the medium, such as transmission, reflection, or scattering, can be induced. In this case, the spectrometer can be used, for example, as a stand-alone device at a location of use or can be integrated into a measuring device or a measuring system, e.g., into a sensor, and/or into a probe that can be immersed in the medium. A measurement spectrum which corresponds to the spectral intensities of the measurement radiation in a wavelength range covered by the detector is derived from the measurement radiation received by the detector. Depending upon the wavelength range of the measurement radiation, a distinction can be made between UV, vis, NIR, and MIR spectroscopy and combinations thereof. Spectrometers operating in the different wavelength ranges are available and sold, for example, by the Endress+Hauser Group.

Using spectrometers, measurands can be determined which have an effect on the measurement spectrum in a manner which is detectable metrologically and is dependent upon the measured value of the measurand. Examples of this are a concentration of an analyte contained in the medium, such as a nitrite content, and/or a nitrate content of the medium. Further examples are a chemical or biological oxygen requirement of the medium, as well as a coloration or a turbidity of the medium.

In order to be able to ascertain a measured value of a specific measurand on the basis of a measurement spectrum, it is necessary in advance to ascertain a dependence of the spectral distribution of the measurement spectra upon the measured value of the measurand that is characteristic of the measurand. In this case, those wavelengths are ascertained at which the intensities of the measurement radiation change as a function of the measured value of the measurand, and the dependence of the spectral distribution of the measurement spectra occurring at these wavelengths is determined from the measured value. A calculation rule is then derived from this, by means of which the measured value of the measurand can be calculated on the basis of measurement spectra derived in the subsequent measurement operation. This calculation rule is determined, for example, in the form of a mathematical and/or statistical model, such as a model referred to in the art as a chemometric model.

When determining the calculation rule, a spectrometer is usually installed in the target application, and measurement spectra are continuously recorded with the spectrometer. In parallel with this, reference measurements of the measurand are carried out, via which a measured reference value of the measurand determined by the reference measurement is assigned to each of the measurement spectra. Subsequently, the calculation rule is determined from the measurement data comprising the measurement spectra and the associated measured reference values.

However, the use of calculation rules determined in this way is regularly limited to a value range of the measurand covered by the measurement data. One reason for this is that an extrapolation of the calculation rule and/or of a model upon which the calculation rule is based to measured value ranges not covered by the measurement data is regularly subject to a large measurement uncertainty. However, both particularly high and very low measured values of the respective measurand occur only very rarely in most applications. This results in either the measurement range having to be limited to measured values frequently occurring in the target application, or a lot of time and effort having to be invested in recording the measurement data.

Alternatively, samples taken in the target application and/or samples generated artificially, e.g., by means of spiking or dilution, could be measured in the laboratory. However, it has been shown that measurement spectra obtainable in this way, such as, in the case of complicated biological matrices, such as occur, for example, in water treatment plants, do not correspond completely to measurement spectra recorded on-site in real applications. Furthermore, in the case of measurements performed in the laboratory, such as, in the case of samples with low stability, there is the problem that their sample properties can change, for example, by a biological decomposition or a conversion. In addition, samples may potentially represent a biological and/or a chemical hazard. This can be the case, for example, with possibly infectious samples taken from a water treatment plant, in the case of toxic samples, and in the case of possibly explosive samples taken from a process. Depending upon the target application, the sample stability and/or the hazard associated with the sampling and/or the measurement thereof can make measurements to be carried out in the laboratory more difficult or even impossible. The measurement of artificial laboratory standards also frequently does not correspond to the spectral matrix existing on-site in the target application. Accordingly, in view of the determination of calculation rules, measured spectra recorded on-site in the respective application generally represent the better alternative, despite the previously mentioned disadvantages.

A further challenge is interference variables, such as components which may be contained in the medium and referred to as interference analytes, which have an effect on the measurement spectra in the same wavelength range as the measurand. Interference variables, such as interference analytes, as well as the concentrations in which they occur are generally different from application to application and may under certain circumstances lead to significant impairments of the spectrometric determinability of the measurands, or even make it impossible in extreme cases.

The influence of interference analytes contained in the medium in a specific application can be taken into account, for example, by recording measurement data which contain the measurement spectra, the associated measured reference values of the measurand, and associated measured reference values of the interference variables, such as measured concentrations of the interference analytes. However, this makes recording the measurement data even more complex. What is more difficult is that the composition of the medium, such as the concentrations of interference analytes, cannot be varied in a controlled manner in most of the target applications.

In conjunction with interference analytes, US 2006/0197015 A1 describes a method for measuring the concentration of a target analyte contained in a sample of a medium, such as a glucose concentration in a blood sample, in which a measurement spectrum of the sample is recorded, and, on the basis of interference spectra gathered in a database, it is ascertained from interference analytes which interference analytes, such as medications, are contained in the sample. In the next step, synthetic spectra with different interference analyte concentrations are calculated from measurement spectra and associated concentrations of the target analyte-comprising measurement data and the interference spectra. Using these synthetic spectra, a calibration constant for the measurement of the concentration of the target analyte is determined, with which a measurement error of the measurement of the concentration of the target analyte caused by the interference analyte contained in the respective sample is minimized. However, this method is very complex, since a new calibration constant must be determined for each individual sample. Furthermore, the measurement range in which the concentration of the target analyte in the respective sample can be determined with high measurement accuracy is also limited here to a value range for which a sufficiently high number of measurement spectra and associated concentrations are contained in the measurement data.

Another possible problem in the determination of calculation rules based upon measurement data recorded in a target application is that the spectrometer used for recording the measurement data in the target application must be suitable for the spectrometric determination of the measurands in the target application. In this case, whether a specific measurand is measurable with the spectrometer depends upon the composition of the medium and the optical path length of the spectrometer used. If it is found, based upon the measurement spectra recorded with the spectrometer already installed in the target application, that the spectrometer used is not suitable, the spectrometer must be replaced with a spectrometer that is more suitable, and measurement data must be recorded again. This case can occur, for example, when an optical saturation occurs in the case of the initially used spectrometer due to interference analytes contained in the medium, in which case so much light is absorbed in the medium that no, or at least no sufficiently accurate, determination of the measurand is possible anymore on the basis of the measurement spectra. If the spectrometer needs to be replaced, this is associated with additional effort and typically also with additional costs.

SUMMARY

It is an object of the present disclosure to specify a more efficient preparation method for preparing spectrometric determinations of at least one measurand to be carried out in a target application that enables measurements of the measurand(s) in the target application that are as accurate as possible in a larger measurement range.

For this purpose, the present disclosure comprises a preparation method for preparing spectrometric determinations of at least one measurand of a medium to be carried out in a target application of a predetermined type of application by means of a spectrometer, in which: a normalized measurand master spectrum with a spectral distribution characteristic of the measurand is determined on the basis of reference data comprising reference spectra and associated reference values of the measurand that are recorded in the target application and/or in applications of the same type of application as the target application, on the basis of the measurand master spectrum, synthetic spectra are generated, which each comprise individual spectra generated for a specific individual value of the measurand on the basis of the measurand master spectrum, wherein the individual values of the individual spectra cover, overall, a value range greater than or equal to, or actually greater than, a value range covered by the reference values, and one or more pieces of information required to carry out the spectrometric determinations of the measurand in the target application are determined and made available on the basis of the synthetic spectra, wherein the piece(s) of information comprise, a property, a wavelength range, and/or a path length range for an optical path length of a spectrometer suitable for carrying out the spectrometric determinations of the measurand in the target application, and/or comprise a calculation rule for a spectrometer that can be used in the target application, with which measured values of the measurand can be determined on the basis of measurement spectra that can be captured with this spectrometer in the target application.

The preparation method offers the advantage that information required for carrying out the spectrometric determinations of the measurand in the target application can be determined in a very efficient manner on the basis of the synthetic spectra. In this case, the large value range covered by the synthetic spectra offers the advantage that the recording of the reference data can be limited to values of the measurand which frequently occur in the type of application of the target application, without limitations and/or quality losses being associated therewith. In this respect, the information makes it possible, to select a spectrometer that is optimally suitable for the measurement task in the target application and with which a high measurement accuracy can be achieved, accordingly, in a large measuring range. In addition, the calculation rule determined on the basis of the synthetic spectra makes it possible to achieve measurement results with high measurement accuracy due to the large value range covered by the synthetic spectra, such as also in measured value ranges, which measurement results only very rarely occur in practice, and/or for which no or only very little reference data are available. This offers the advantage that measurement results with higher measurement accuracy can be achieved with the calculation rule determined on the basis of the synthetic spectra in a larger measurement range than with a calculation rule determined on the basis of the reference data. With the preparation method, both a reduction in the complexity associated with recording the reference data and an increase in the measurement range and an improvement in the measurement accuracy can thus be achieved.

One embodiment comprises a preparation method in which: the reference data for each reference spectrum in each case comprise an optical path length of the spectrometer with which the respective reference spectrum was recorded; the reference spectra are normalized to a reference value of the respective measurand and a reference value of the optical path length, and the measurand master spectrum is determined on the basis of the normalized reference spectra as a measurand master spectrum normalized to the reference value of the measurand and the reference value of the optical path length.

A development of the embodiment comprises a preparation method in which the measurand master spectrum is determined by means of a mean value or median formation carried out on the basis of the normalized reference spectra, and/or is determined using at least one spectral decomposition algorithm and/or at least one smoothing filter for smoothing the reference spectra and/or the normalized reference spectra.

An additional embodiment of the preparation method provides that the measurand master spectrum and the synthetic spectra be absorption spectra, and the individual spectra be either calculated by means of a linear relationship between spectral absorption and the value of the measurand, or be each determined on the basis of a non-linear calculation rule reflecting a correlation between spectral absorption and the value of the measurand.

According to a first development, at least one interference variable occurring in the target application is taken into account in that, for each interference variable to be taken into account, one normalized interference master spectrum, such as an interference master spectrum normalized to a reference value of the respective interference variable and the reference value of the optical path length, is determined, which has a spectral distribution characteristic of the respective interference variable, and the synthetic spectra comprise individual spectra which are determined on the basis of the measurand master spectrum and the interference spectrum of each interference variable to be taken into account, and which take into account an influence of the interference variable(s).

According to a second development, optical saturation is taken into account in that the synthetic spectra are generated in such a way that they comprise individual spectra that take into account the optical saturation and/or individual spectra that take into account the optical saturation and the influence of each interference variable to be taken into account.

According to a third development, the synthetic spectra are generated in such a way that they each comprise, for one or more limit values, individual spectra that take into account the optical saturation and/or individual spectra that take into account the optical saturation and the influence of each interference variable to be taken into account, wherein: each limit value corresponds in each case to a constant or wavelength-dependent upper limit value for absorption values which can be detected metrologically, above which the optical saturation occurs, in the determination of the individual spectra that take into account the optical saturation, all of the spectral absorption values that are determined on the basis of the measurand master spectrum (M) and exceed the respective limit value (amax) are reduced to the limit value (amax), and, in the determination of the individual spectra that take into account the optical saturation and the influence of each interference variable to be taken into account, all of the spectral absorption values that are determined on the basis of the measurand master spectrum and the interference master spectrum of each interference variable to be taken into account and exceed the respective limit value are reduced to the limit value.

According to one embodiment of the first, second, and/or third development, the information or at least one or each of the pieces of information is respectively determined on the basis of the individual spectra that take into account the optical saturation and/or the influence of the interference variable(s).

A development of the first, second, and/or third development comprises a preparation method in which, on the basis of the individual spectra that take into account the influence of the interference variable(s) and/or the individual spectra that take into account the influence of the interference variable(s) and the optical saturation, it is checked as to whether the measurand in the target application can be determined by spectrometry with a predetermined measurement accuracy if each interference variable occurs there within a value range predetermined for the respective interference variable, and a corresponding checking result is made available.

A development of the second and/or third development comprises a preparation method in which, on the basis of the individual spectra that take into account the optical saturation and/or on the basis of the individual spectra that take into account the optical saturation and the influence of the interference variable(s), the wavelength range, the path length range of the optical path lengths, and/or at least one further property of spectrometers suitable for carrying out the spectrometric determinations of the measurand in the target application is ascertained, and each of these pieces of information is made available, and/or the spectrometer that can be used in the target application is selected using this information.

A further development of the second and/or third development comprises a preparation method, in which, on the basis of the individual spectra that take into account the optical saturation and/or the individual spectra that take into account the optical saturation and the influence of the interference variable(s): a first target value for the optical path length of the spectrometer usable in the target application is determined and made available, in which a measurement range in which the measurand can be determined with a predetermined measurement accuracy is at a maximum, a second target value for the optical path length of the spectrometer usable in the target application is determined and made available, in which a measurement accuracy with which the measurand can be determined in a predetermined measurement range is at a maximum, and/or a maximum value for the optical path length of the spectrometer usable in the target application is determined and made available, which corresponds to the largest possible optical path length at which measurements of the measurand can still be carried out with a predetermined measurement accuracy.

A development of the last-mentioned development comprises a preparation method in which the spectrometer usable in the target application is selected on the basis of the first target value, the second target value, and/or the maximum value such that it has an optical path length corresponding to one of the target values and/or is less than the maximum value, and the calculation rule is determined on the basis of the individual spectra generated for the optical path length of this spectrometer.

A further development comprises a preparation method in which, on the basis of the synthetic spectra: at least one measurement range end of a measurement range is determined and made available, in which measurements of the measurand with a predetermined measurement accuracy can be carried out by means of the calculation rule, and/or an achievable measurement accuracy is determined and made available, by means of which measurements of the measurand can be performed in a predetermined measurement range by means of the calculation rule.

Furthermore, the present disclosure comprises a computer program for preparing spectrometric determinations of at least one measurand of a medium to be carried out in a target application of a predetermined type of application by means of a spectrometer, having computer-readable program code elements which, when executed on a computer, cause the computer to carry out the preparation method.

Furthermore, the present disclosure comprises a computer program product with such a computer program and at least one computer-readable medium on which at least the computer program is stored.

Furthermore, the present disclosure comprises a use of the preparation method in a method for preparing and carrying out at least one spectrometric determination of at least one measurand in a target application of a predetermined type of application, in which the preparation method is performed for the or each measurand, each calculation rule determined by means of the preparation method is stored in a memory of the spectrometer that can be used in the target application, and at least one determination of a measured value of the measurand or at least one of the measurands by means of the calculation rule determined for the respective measurand is performed with the spectrometer in the target application.

In addition, the present disclosure comprises a use of at least one calculation rule determined by means of the preparation method in a spectrometer, wherein the spectrometer comprises a measuring device which is designed to calculate the measured value of the associated measurand on the basis of the measurement spectra derived from the spectrometer by means of the calculation rule and to output it as a measured value and/or in the form of a measurement signal corresponding to the measured value via an interface of the spectrometer and/or to make it available in a form that can be read out.

BRIEF DESCRIPTION OF THE DRAWINGS

The present disclosure and its advantages will now be explained in detail using the figures in the drawing, which show one exemplary embodiment. The same elements are indicated by the same reference numbers in the figures.

FIG. 3 shows reference spectra recorded with spectrometers with an identical first optical path length at different values of the measurand;

FIG. 4 shows reference spectra recorded with spectrometers with an identical second optical path length at different values of the measurand;

FIG. 5 shows reference spectra recorded with spectrometers with an identical third optical path length at different values of the measurand;

FIG. 6 shows a measurand master spectrum;

FIG. 7 shows synthetic spectra; and

FIG. 8 shows synthetic spectra that take into account an optical saturation.

DETAILED DESCRIPTION

In the following, a preparation method, such as a computer-implemented method, for preparing spectrometric determinations of at least one measurand of a medium to be carried out in a target application of a predetermined type of application by means of a spectrometer is described.

The preparation method can be used in conjunction with a plurality of different types of applications. In this respect, applications known from practice can be divided into predetermined types of applications, such as breweries, water monitoring facilities, water treatment plants such as municipal water treatment plants or industrial water treatment plants used in certain industrial sectors, laundry facilities, or plants carrying drinking water, in which the media have comparable properties at least with respect to their main components, including their matrices. In each target application, depending upon the type of application, different measurands, such as a concentration of an analyte contained in the measured medium, a chemical oxygen requirement, a biological oxygen requirement, a coloration, and/or a turbidity of the medium can be determined. For example, spectrometers are used in water treatment plants in order to determine and/or monitor a nitrite content and/or a nitrate content of service water supplied to the water treatment plant and/or water treated in the water treatment plant.

Figure 1:
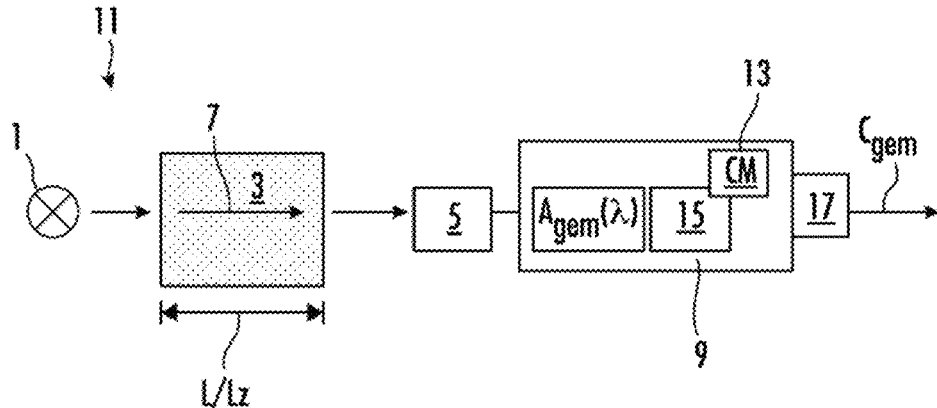
FIG. 1 shows a spectrometer.

For this purpose, depending upon the measurand and/or the type of target application, spectrometers with different designs, and spectrometers with different optical path lengths, can be used. FIG. 1 shows an example of a spectrometer, operating in transmission, with a radiation source 1, which radiates radiation through the medium 3 during measurement operation, and a detector 5, which receives measurement radiation emerging from the medium 3. In this case, an interaction of the radiation with the medium 3, such as an absorption dependent upon a length L of the optical path 7 and the wavelength-dependent absorption properties of the medium 3, takes place along an optical path 7 running through the medium 3. The spectrometer comprises a measurement electronics unit 9 connected to the detector 5, which, on the basis of the radiation intensities $Igem(\lambda)$ of the measurement radiation detected metrologically by the detector 5 at different wavelengths, derives a measurement spectrum $Agem(\lambda)$. The measurement spectrum can be determined, for example, as an intensity spectrum that is made available by the measurement electronics unit 9, e.g., in the form of digital spectrometric raw data or analog spectrometric raw signals that comprise value pairs of intensity $Igem(\lambda)$ and associated wavelength 2. Alternatively, the measurement electronics unit 9 is designed to determine the measurement spectrum $Agem(\lambda)$ as an absorption spectrum. In this case, the individual absorption values $a(\lambda i)$ of the measurement spectrum $Agem(\lambda)$ occurring at a specific wavelength $\lambda i$, e.g., according to: $a(\lambda i) := -Log[Igem(\lambda i)/I0(\lambda i)]$, are determined as a logarithm of the ratio of the radiation intensity $I0(\lambda i)$ entering the medium 3 at this wavelength $\lambda i$ to the intensity $Igem(\lambda i)$ of the measurement radiation impinging on the detector 5 measured by the detector 5 at this wavelength $\lambda i$.

The present disclosure is not limited to spectrometers operating in transmission, but can also be used completely analogously in conjunction with spectrometers which use another form of interaction of the radiation with the medium, such as reflection or scattering.

Figure 2:
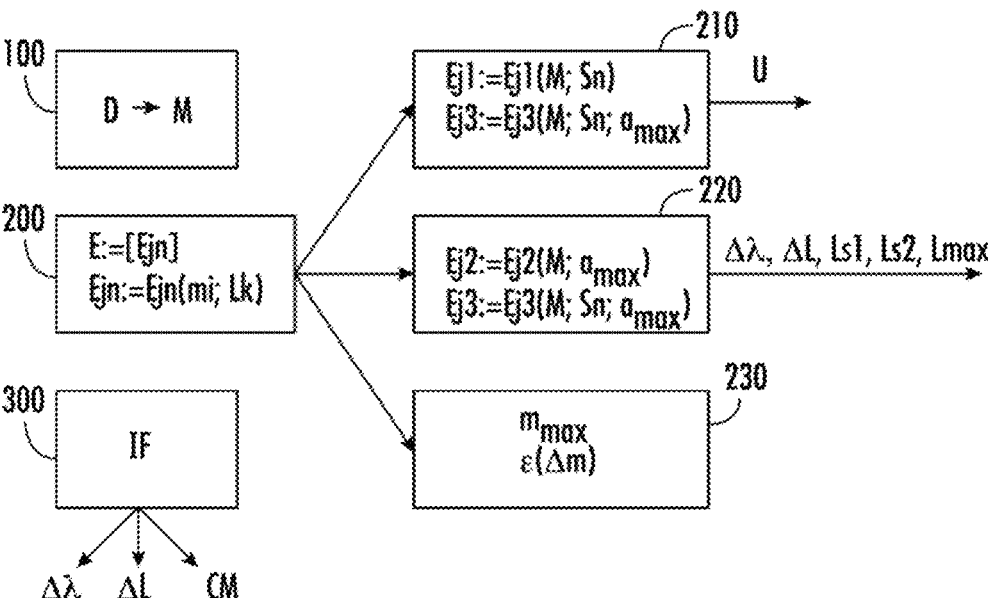
FIG. 2 shows method steps of the preparation method.

The individual method steps of the preparation method are shown in FIG. 2 in a flowchart and described below using the example of a single measurand. The preparation method can also be carried out completely analogously for at least one further measurand to be determined by spectrometry with the spectrometer that can be used in the target application.

As shown in FIG. 1, the preparation method comprises a first method step 100, in which a measurand master spectrum M having a spectral distribution characteristic of the measurand is determined on the basis of reference data D recorded in the target application and/or in applications of the same type of application as the target application.

For this purpose, the reference data D comprise reference spectra recorded with spectrometers and reference values assigned to the individual reference spectra, for example, reference values of the measurand determined by reference measurements. Absorption spectra are suitable as reference spectra. The reference spectra contained in the reference data D can, for example, be reference spectra recorded with identically designed spectrometers or with spectrometers having identical optical path lengths L. Preferably, the reference data D comprise reference spectra recorded with spectrometers with different, known optical path lengths L. In this case, the reference data D for each reference spectrum additionally also comprise the optical path length L of the spectrometer with which the respective reference spectrum was recorded.

In this regard, FIG. 3 shows examples of reference spectra recorded with spectrometers with an identical first optical path length L1 at different values of the measurand, FIG. 4 shows reference spectra recorded with spectrometers with an identical second optical path length L2 at different values of the measurand, and FIG. 5 shows reference spectra recorded with spectrometers with an identical third optical path length L3 at different values of the measurand. FIG. 6 shows an example of a measurand master spectrum M derived from the reference spectra shown in FIGS. 3 through 5.

The creation of the measurand master spectrum M proceeds, for example, such that the individual reference spectra are normalized to a reference value mr of the measurand. If the reference spectra have all been recorded with spectrometers having identical optical path lengths L, a normalization of the reference spectra to a reference value Lr of the optical path length L given by the optical path length L of these spectrometers is also simultaneously given. If the reference spectra were recorded with spectrometers having different optical path lengths L, the reference spectra are additionally normalized based upon the associated optical path lengths L contained in the reference data D to a reference value Lr the optical path length L. Subsequently, the measurand master spectrum M reflecting the characteristic properties of these normalized reference spectra is derived from the reference spectra normalized in this way. In this case, the measurand master spectrum M can be determined, for example, by means of a mean value or median formation carried out on the basis of the normalized reference spectra. Alternatively or additionally, spectral decomposition algorithms and/or smoothing filters for smoothing the reference spectra and/or the normalized reference spectra, for example, can be used to determine the measurand master spectrum M.

Taking into consideration a measurand given by a concentration of an analyte contained in the medium 3, the measurand master spectrum M corresponds to an ideal spectrum of a pure substance at a concentration value corresponding to the reference value mr of the measurand, and an optical path length L corresponding to the reference value of the optical path length Lr.

Following the creation of the measurand master spectrum M, synthetic spectra E are generated in method step 200 on the basis of the measurand master spectrum M. The synthetic spectra E each comprise, for a specific individual value mi of the measurand, individual spectra Ejn generated on the basis of the measurand master spectrum M. Examples in this regard are shown in FIG. 7. In conjunction with reference spectra designed as absorption spectra, the measurand master spectrum M derived therefrom and the synthetic spectra E are also absorption spectra.

The measurand master spectrum M offers the advantage that synthetic individual spectra Ejn can be determined therefrom in an arbitrarily high number for individual values mi of the measurand that are freely selectable within very wide limits. Thus, individual spectra Ejn can also be determined for individual values mi of the measurand that do not occur at all, or only in a very small number, in the reference data. The synthetic spectra E are generated in such a way that the individual values mi of the individual spectra Ejn cover overall a value range of the measurand which is greater than or equal to a value range of the measurand covered by the reference data D, wherein the value range is preferably actually greater than the value range covered by the reference data.

When determining the synthetic spectra E, a linear relationship between spectral absorption and the value of the measurand can be assumed for most of the measurands, such as concentrations of an analyte contained in the medium 3. In this case, the individual spectra Ejn are each calculated from the measurand master spectrum M by means of the linear relationship. Where this assumption is not justified, a non-linear calculation rule at least approximately reflecting the relationship between spectral absorption and the value of the measurand, for example, is used for the numerical determination of the individual spectra Ejn.

Compared to the reference spectra, the synthetic spectra E offer the advantage that they reflect the spectral distribution of the spectra expected as a function of the value of the measurand in the target application much more comprehensively and precisely than the reference data, and also in edge regions of the value range covered by the reference values, in which generally only very little reference data are available. Furthermore, they more precisely reflect the expected spectral distribution and also for values of the measurand which lie outside the value range covered by the reference values or for which no reference data are available.

Following the generation of the synthetic spectra E, in method step 300, one or more pieces of information IF required for carrying out the spectrometric determinations of the measurand in the target application are determined and made available on the basis of the synthetic spectra E.

This information IF comprises, for example, pieces of information on the basis of which a spectrometer that is optimally suitable for carrying out the spectrometric determinations of the measurand in the target application can be selected. Examples thereof are information IF, such as a property, a wavelength range $\Delta\lambda$, and/or a path length range $\Delta L$ for the optical path length L of a spectrometer suitable for carrying out the spectrometric determinations of the measurand in the target application.

Alternatively or in addition to this, the information IF preferably comprises a calculation rule CM, determined on the basis of the synthetic spectra E, for a spectrometer 11 that can be used in the target application, such as the spectrometer shown in FIG. 1, with which rule measured values Cgem of the measurand can be determined on the basis of measurement spectra Agem($\lambda$) that can be captured using this spectrometer 11 in the target application. This calculation rule CM is determined, for example, in the form of a mathematical and/or statistical model, such as a model referred to in the art as a chemometric model, and/or made available, for example, in the form of an algorithm.

If the optical path length L of all the spectrometers used for recording the reference data D is equal to the optical path length Lz of the spectrometer 11 usable in the target application, the optical path length L can remain disregarded during the derivation of the measurand master spectrum M, during the generation of the synthetic spectra E, and during the determination of the calculation rule CM. If this is not the case, the measurand master spectrum M is determined in the manner described above as a measurand master spectrum M normalized to the reference value Lr for the optical path length L, and the optical path length L is taken into account in the generation of the synthetic spectra E and the calculation rule CM. To do this, the individual spectra Ejn are generated from the measurand master spectrum M such that each individual spectrum Ejn:=Ejn(mi, Lk) reflects the spectral profile at a specific value combination [mi, Lk] of the individual value mi of the measurand and the optical path length Lk. In this case, the calculation rule CM is determined based upon individual spectra Ejn generated for the optical path length Lz of the spectrometers 11 usable in the target application.

The preparation method is used, for example, in a method for preparing and carrying out at least one spectrometric determination of at least one measurand in the target application. In the context of this method, the preparation method is executed for the or for each measurand. Then, each calculation rule CM determined by means of the preparation method is stored in a memory 13 of the spectrometer 11 that can be used in the target application. Subsequently, this spectrometer 11 is used in the target application to determine at least one measurement value Cgem of the measurand or at least one of the measurands, in each case by means of the calculation rule CM determined for the respective measurand.

As shown in FIG. 1, the measurement electronics unit 9 of the spectrometer 11 for this purpose has, for example, a measuring device 15, such as a microprocessor, which is designed to calculate the measured value Cgem of the associated measurand on the basis of the measurement spectra Agem($\lambda$) derived from the spectrometer 11 by means of the calculation rule CM and to output it is as a measured value Cgem and/or in the form of a measurement signal corresponding to the measured value Cgem via an interface 17 of the spectrometer 11 and/or to make it available in readable form.

The use of each calculation rule CM determined by means of the preparation method in the spectrometer 11 offers the advantage that the spectrometer has a larger measurement range in each case with respect to the respective measurand and/or has a higher measurement accuracy in a larger measurement range than conventional spectrometers in which calculation rules are used, the range of application of which is limited to the range covered by the reference data to a sufficient extent.

The present disclosure has the advantages mentioned above. Optionally, individual method steps and/or components of the spectrometer 11 that can be used or is used in the target applications can each have different embodiments that can be used individually and/or in combination with one another. Some embodiments that are currently preferred are described below.

Thus, for example, at least one interference variable occurring in the target application can be taken into account in the preparation method. Interference variables are influencing factors which, in the same wavelength range as the measurand, have an effect on the intensities and/or the spectral distribution of the intensity spectra that can be metrologically detected with the detector 5, and thus could impair the spectrometric determination of the measurand. An example of this is, for example, concentrations of interference analytes possibly contained in the medium. In view of the determination of the nitrate content of water, nitrite, sulfate, and chloride, for example, can be considered as interference analytes.

Taking the interference variable(s) into account is done in that a normalized interference master spectrum Sn with a spectral distribution that is characteristic of the respective interference variable is determined for each interference variable to be taken into account. Similarly to the determination of the measurand master spectra M, the interference master spectra Sn can also be determined in each case on the basis of interference data, which comprise the interference spectra recorded with spectrometers and the interference values of the interference variable assigned to the individual interference spectra. Just as with the reference data D, the interference data are also recorded, for example, in the target application and/or in applications of the same type of application as the target application. Alternatively or additionally, interference data recorded otherwise, such as data recorded in a laboratory, can also be used, depending upon the interference variable. Just as with the measurand master spectrum M, the interference master spectra Sn are also each determined, for example, in such a way that they correspond to an ideal spectrum of a pure substance at a reference value of the respective interference variable, for example, a defined concentration. In this case, the interference master spectra Sn are also, for example, each normalized to a reference value of the respective interference variable or, alternatively, to the reference value of the respective interference variable and the reference value Lr of the optical path length L.

The interference variable master spectra Sn offer the advantage that they can be used to simulate the influence of the individual interference variables as a function of their value, as well as possibly also as a function of the optical path length L.

To take into account the or each interference variable to be taken into account, the synthetic spectra E are generated in such a way that they comprise individual spectra Ej1(M; Sn) that take into account the influence of the interference variable(s) and are determined by means of the measurand master spectrum and the interference spectrum Sn of each interference variable to be taken into account.

Alternatively or in addition to taking into account the interference variable(s), an optical saturation possibly occurring in the measurement operation, for example, is taken into account in the preparation method. Optical saturation occurs when the absorption occurring along the optical path 7 exceeds an upper limit value amax, illustrated in FIG. 7, for absorption values that can be detected metrologically, above which further additional absorption no longer results in an increase that can be resolved metrologically in the measured absorption value. The limit value amax is a constant or even wavelength-dependent spectrometer property which can be measured experimentally or determined numerically in each case for spectrometers of a wide range of types. The limit value amax can be defined, calculated, and/or specified as a function of the optical path length L.

To take the optical saturation into account, the synthetic spectra E are generated such that they comprise individual spectra Ej2:=Ej2(M; amax) that take into account the optical saturation and/or individual spectra Ej3:=Ej3(M; Sn; amax) that take into account the optical saturation and the influence of each interference variable to be taken into account.

These individual spectra Ej2, Ej3 are generated in method step 200 for at least one or even for several different limit values amax. In this case, for example, the procedure is that, when determining each individual spectrum Ej2, Ej3, all spectral absorption values determined on the basis of the measurand master spectrum M or respectively on the basis of the measurand master spectrum M and the interference master spectrum Sn of each interference variable to be taken into account are reduced to the limit value amax if they exceed the limit value amax. This results in the synthetic spectra E shown in FIG. 8 that take into account the optical saturation.

The optical saturation and/or the influence of the individual spectra Ej1, Ej2, Ej3 that take into account the interference variable(s) can be used in different ways.

One embodiment provides that the information IF or at least one, and preferably each, of the pieces of information IF, such as the wavelength range $\Delta\lambda$, the path length range $\Delta L$, and/or the calculation rule CM, be determined in each case on the basis of the individual spectra Ej1, Ej2, Ej3 that take into account the optical saturation and/or the influence of the interference variable(s).

As a result, in the presence of the interference variable(s), an improved selection of the optimally suitable spectrometer and a higher measurement accuracy can be achieved. However, this requires that the spectrometric determinations of the measurand can be carried out in the target application, and a spectrometer 11 suitable for carrying out these spectrometric determinations be used in the target application.

In this respect, the preparation method comprises, for example, a method step 210 in which, on the basis of the individual spectra Ej1 that take into account the influence of the interference variable(s) and/or on the basis of the individual spectra Ej3 that take into account the influence of the interference variable(s) and the optical saturation, it is checked whether the measurand in the target application can be determined by spectrometry with a predetermined measurement accuracy when each interference variable occurs within a value range predetermined for the respective interference variable. For this purpose, the individual spectra Ej1, Ej3 used for carrying out the check comprise individual spectra Ej2, Ej3 generated for a specific value combination of the values of the measurand and each interference variable and the value combinations of which cover a multidimensional region spanned by value ranges predetermined for the measurand and each interference variable. Following the check, a corresponding checking result U is made available that indicates whether or not the measurements can be carried out.

Alternatively or additionally thereto, the preparation method comprises, for example, a method step 220 in which, in advance, on the basis of the synthetic spectra E, and preferably on the basis of the individual spectra Ej2 that take into account the optical saturation and/or the individual spectra Ej3 that take into account the optical saturation and the influence of the interference variable(s), at least one of the pieces of information IF that can be used for carrying out the spectrometric determinations of the measurand in the target application is ascertained. These pieces of information IF include the wavelength range $\Delta\lambda$, the path length range $\Delta L$ of the optical path lengths L, and/or at least one further property of spectrometers suitable for carrying out the spectrometric determinations of the measurand in the target application. In this case, each of these pieces of information IF is made available, and/or the spectrometer 11 that can be used in the target application is selected on the basis of this information IF.

Optionally, in method step 220, on the basis, for example, of the individual spectra Ej2 that take into account the optical saturation and/or on the basis of the individual spectra Ej3 that take into account the optical saturation and the influence of the interference variable(s), at least one target value Ls1, Ls2 and/or a maximum value Lmax for the optical path length L of the spectrometer 11 usable in the target application is determined and made available. In this case, for example, a first target value Ls1 for the optical path length L is determined in which the measurement region in which the measurand can be determined with a predetermined measurement accuracy is at a maximum. Alternatively or additionally thereto, a second target value Ls2 for the optical path length L is, for example, determined in which the measurement accuracy with which the measurand can be determined in a predetermined measurement range is at a maximum. The maximum value Lmax corresponds to the largest possible optical path length L at which measurements of the measurand can still be carried out with a predetermined measurement accuracy. In this embodiment, the individual spectra Ej2, Ej3 used to determine the first target value Ls1, the second target value Ls2, and/or the maximum value Lmax comprise, for example, individual spectra Ej2, Ej3 generated for several different limit values amax corresponding in each case to a specific optical path length L.

In the following, the spectrometer 11 that can be used in the target application is selected, for example, on the basis of the first target value Ls1, the second target value Ls2, and/or the maximum value Lmax and has a corresponding optical path length Lz, which corresponds to one of the target values Ls1, Ls2 and/or is less than the maximum value Lmax. Accordingly, the calculation rule CM that can be used or is used in this spectrometer 11 is also determined on the basis of the individual spectra Ej2, Ej3 generated for the optical path length Lz of this spectrometer 11.

Alternatively or additionally, the preparation method comprises, for example, a method step 230 in which, on the basis of the synthetic spectra E, at least one measurement range end mmax of a measurement range $\Delta m:=[mmin; mmax]$ is determined, in which measurements of the measurand with a predetermined measurement accuracy can be carried out by means of the calculation rule CM determined on the basis of the synthetic spectra E. Alternatively or in addition to this, on the basis of the synthetic spectra E, an achievable measurement accuracy $\varepsilon(\Delta m)$, for example, is determined and made available, with which measurements of the measurand in a predetermined measurement range $\Delta m$ can be performed by means of the calculation rule CM determined on the basis of the synthetic spectra E.

The preparation method is preferably designed as a computer-implemented method. In this respect, the present disclosure also comprises a computer program for preparing spectrometric determinations of at least one measurand of a medium 3 to be carried out in a target application of a predetermined type of application by means of a spectrometer. This computer program comprises computer-readable program code elements which, when executed on a computer, cause the computer to carry out the previously described preparation method. Furthermore, the present disclosure comprises a computer program product having at least one computer-readable medium, on which at least the computer program is stored.

The invention claimed is:

1. A spectrometric measurement method of determining a value of at least one measurand of a medium in a target application, comprising:

for each measurand performing a preparation method comprising:

performing reference measurements of the measurand in the target application including determining reference spectra of the medium and associated reference values of the measurand;

recording reference data including the reference spectra and the associated reference values;

determining a master spectrum of the reference data;

generating synthetic spectra, based on the master spectrum, which comprise individual spectra that are each generated for a specific individual value of the measurand, wherein the individual values cover a value range greater than or equal to a value range covered by the reference values, and determining and providing one or more pieces of information required to carry out spectrometric determinations of the measurand in the target application that are based on the synthetic spectra, wherein the piece(s) of information comprise a property, a wavelength range, and/or a path length range for an optical path length of a spectrometer suitable for carrying out the spectrometric determinations of the measurand in the target application, and/or comprise a calculation rule for a spectrometer that can be used in the target application, with which measured values of the measurand can be determined on the basis of measurement spectra determinable with this spectrometer in the target application;

based on the piece(s) of information provided by the preparation method(s), performing at least one of selecting a spectrometer suitable to be employed in the target application and/or implementing the calculation rule in a spectrometer suitable to be employed in the target application, and with the spectrometer suitable to be employed in the target application, carrying out at least one spectrometric determination of the measurand(s) of the medium in the target application.

2. The method according to claim 1, in which:

the reference data for each reference spectrum in each case comprise an optical path length of the spectrometer with which the respective reference spectrum was recorded;

the reference spectra are normalized to a reference value of the respective measurand and a reference value of the optical path length, and the measurand master spectrum is determined on the basis of the normalized reference spectra as a measurand master spectrum normalized to the reference value of the measurand and the reference value of the optical path length.

3. The method according to claim 2, in which the measurand master spectrum is determined by using a mean value or median formation carried out on the basis of the normalized reference spectra, and/or is determined using at least one spectral decomposition algorithm and/or at least one smoothing filter for smoothing the reference spectra and/or the normalized reference spectra.

4. The method according to claim 1, in which the measurand master spectrum and the synthetic spectra are absorption spectra, and the individual spectra are either calculated by means of a linear relationship between spectral absorption and the value of the measurand, or are each determined on the basis of a non-linear calculation rule reflecting a correlation between spectral absorption and the value of the measurand.

5. The method according to claim 1, in which at least one interference variable occurring in the target application is taken into account in that, for each interference variable to be taken into account, one normalized interference master spectrum, an interference master spectrum normalized to a reference value of the respective interference variable and the reference value of the optical path length, is determined, which has a spectral distribution characteristic of the respective interference variable, and the synthetic spectra comprise individual spectra which are determined on the basis of the measurand master spectrum and the interference spectrum of each interference variable to be taken into account and which take into account an influence of the interference variable.

6. The method according to claim 1, wherein an optical saturation is taken into account in that the synthetic spectra are generated such that they comprise individual spectra that take into account the optical saturation and/or individual spectra that take into account the optical saturation and the influence of each interference variable to be taken into account.

7. The method according to claim 1, in which the synthetic spectra are generated such that they each comprise, for one or more limit values, individual spectra that take into account the optical saturation and/or individual spectra that take into account the optical saturation and the influence of each interference variable to be taken into account, wherein:

each limit value corresponds to a constant or wavelength-dependent upper limit value for measurement values which can be detected metrologically, above which the optical saturation occurs, in the determination of the individual spectra that take into account the optical saturation, all of the spectral absorption values that are determined on the basis of the measurand master spectrum and exceed the respective limit value are reduced to the limit value, and, in the determination of the individual spectra that take into account the optical saturation and the influence of each interference variable to be taken into account, all of the spectral absorption values that are determined on the basis of the measurand master spectrum and the interference master spectrum of each interference variable to be taken into account and exceed the respective limit value are reduced to the limit value.

8. The method according to claim 5, in which the information or at least one or each of the pieces of information is determined in each case on the basis of the individual spectra that take into account the optical saturation and/or the influence of the interference variable(s).

9. The method according to claim 5, in which, on the basis of the individual spectra that take into account the influence of the interference variable(s) and/or the individual spectra that take into account the influence of the interference variable(s) and the optical saturation, it is checked as to whether the measurand in the target application can be determined by spectrometry with a predetermined measurement accuracy if each interference variable occurs there within a value range predetermined for the respective interference variable, and a corresponding checking result is made available.

10. The method according to claim 6, in which:

on the basis of the individual spectra that take into account the optical saturation and/or on the basis of the individual spectra that take into account the optical saturation and the influence of the interference variable(s), the wavelength range, the path length range of the optical path lengths, and/or at least one further property of spectrometers suitable for carrying out the spectrometric determinations of the measurand in the target application is ascertained, and each of these pieces of information is made available, and/or the spectrometer that can be used in the target application is selected using this information.

11. The method according to claim 6, in which, on the basis of the individual spectra that take into account the optical saturation and/or the individual spectra that take into account the optical saturation and the influence of the interference variable(s):

a first target value for the optical path length of the spectrometer that can be used in the target application is determined and made available, in which a measurement region in which the measurand can be determined with a predetermined measurement accuracy is at a maximum, a second target value for the optical path length of the spectrometer that can be used in the target application is determined and made available, in which a measurement accuracy with which the measurand can be determined in a predetermined measurement range is at a maximum, and/or a maximum value for the optical path length of the spectrometer that can be used in the target application is determined and made available, which corresponds to the largest possible optical path length at which measurements of the measurand can still be carried out with a predetermined measurement accuracy.

12. The method according to claim 11, in which the spectrometer that can be used in the target application is selected on the basis of the first target value, the second target value, and/or the maximum value such that it has an optical path length which corresponds to one of the target values and/or is less than the maximum value, and the calculation rule is determined on the basis of the individual spectra generated for the optical path length of this spectrometer.

13. The method according to claim 1, in which, on the basis of the synthetic spectra:

at least one measurement range end of a measurement range is determined and made available, in which measurements of the measurand can be carried out with a predetermined measurement accuracy by means of the calculation rule, and/or an achievable measurement accuracy is determined and made available, by means of which measurements of the measurand can be performed in a predetermined measurement range by means of the calculation rule.

14. A computer program product for preparing spectrometric determinations of at least one measurand of a medium to be carried out in a target application of a predetermined type of application by means of a spectrometer, comprising a non-transitory computer-readable medium and a computer program product stored on the non-transitory computer-readable medium, the computer program comprising computer-readable program code elements which, when executed on a computer, cause the computer to carry out a preparation method according to claim 1.

15. The method according to claim 1, in which each calculation rule determined by means of the preparation method is stored in a memory of the spectrometer that can be used in the target application, and at least one determination of a measured value of the measurand or at least one of the measurands, in each case by means of the calculation rule determined for the respective measurand, is performed with the spectrometer in the target application.

16. The method according to claim 1, wherein the spectrometer carrying out the at least one spectrometric determination of the at least one measurand of the medium in the target application comprises a measuring device which is designed to calculate the measured value of the associated measurand by means of the calculation rule determined by the preparation method on the basis of measurement spectra derived from the spectrometer and to output it as a measured value and/or in the form of a measurement signal corresponding to the measured value via an interface of the spectrometer and/or to make it available in readable form.

\* \* \* \* \*